United States Patent
Goldfoot (10) Patent No.: US 7,418,136 B2
(45) Date of Patent: Aug. 26, 2008

(54) METHOD OF SHAPE RECOGNITION USING POSTULATED LINES

(76) Inventor: Josh Aaron Goldfoot, 629 N. Nelson St., Arlington, VA (US) 22203

(*) Notice: Subject to any disclaimer, the term of this patent is extended or adjusted under 35 U.S.C. 154(b) by 659 days.

(21) Appl. No.: 10/811,697

(22) Filed: Mar. 30, 2004

(65) Prior Publication Data
US 2004/0213461 A1   Oct. 28, 2004

Related U.S. Application Data (62) Division of application No. 09/782,445, filed on Feb. 12, 2001, now abandoned.

(51) Int. Cl.
*G06K 9/00* (2006.01)
(52) U.S. Cl. .................. 382/187; 382/186; 382/188; 382/189
(58) Field of Classification Search ........ 382/313–315, 382/187–189, 119, 186; 345/173, 179, 180–183, 345/158; 178/18.03
See application file for complete search history.

(56) References Cited

U.S. PATENT DOCUMENTS

| | | | |
|---|---|---|---|
| 4,878,249 A | 10/1989 | Mifune et al. ............... 382/13 |
| 4,933,865 A | 6/1990 | Yamamoto et al. ......... 364/518 |
| 4,969,201 A | 11/1990 | Takasaki et al. ............ 382/22 |
| 4,972,496 A | 11/1990 | Sklarew ....................... 382/13 |
| 5,038,382 A | 8/1991 | Lipscomb .................... 382/13 |
| 5,065,439 A | 11/1991 | Takasaki et al. ............ 382/25 |
| 5,544,265 A | 8/1996 | Bozinovic et al. ......... 382/203 |
| 5,546,476 A | 8/1996 | Mitaka et al. .............. 382/201 |
| 5,621,817 A | 4/1997 | Bozinovic et al. ......... 382/189 |
| 6,044,174 A * | 3/2000 | Sinden ....................... 382/187 |
| 6,125,206 A * | 9/2000 | Yokota et al. .............. 382/189 |

OTHER PUBLICATIONS

Theo Pavlidis & Christopher J. Van Wyk, "An Automatic Beautifier for Drawings and Illustrations," Siggraph vol. 19, pp. 225-234, San Francisco, Jul.22-26, 1985.
Joaquim A. Jorge & Manuel J. Fonseca, "A Simple Approach to Recognise Geometric Shapes Interactively," Departamento de Engenharia Informática, IST/UTL, Av. Rovisco Pais, 1049-001 Lisboa, Portugal.

* cited by examiner

*Primary Examiner*—Brian Le

(57) ABSTRACT

A method for recognizing shapes is disclosed. A computer, such as a handheld computer with pen input, is used to receive a drawing from a user. The user's drawing is then analyzed to identify the location of potential vertices of angles or knots of splines using a technique of hypothesizing lines between known important points and calculating the distance between other points and that Postulated line. This process is repeated until all important points are located. Also disclosed is a method for determining whether a set of points is straight or curved.

1 Claim, 6 Drawing Sheets

METHOD OF SHAPE RECOGNITION USING POSTULATED LINES

CROSS-REFERENCE TO RELATED APPLICATIONS

This application is a divisional of U.S. Ser. No. 09/782,445, filed on Feb. 12, 2001, now abandoned, by Josh Goldfoot, and entitled "Method of Shape Recognition Using Postulated Lines," which is hereby incorporated by reference.

REFERENCE TO COMPUTER PROGRAM LISTING APPENDIX

A computer program listing of the source code for the preferred embodiment of the invention is attached as an appendix hereto in the file "code.asm" submitted on a compact disc with this application. This specification hereby incorporates by reference that computer program listing in its entirety. A total of two discs are submitted with this application, one being a duplicate of the other.

BACKGROUND OF THE INVENTION

This invention relates to the field of computer software that recognizes shapes drawn by a user.

In the field of computer systems with graphical interfaces, it is sometimes necessary for the computer to allow a user to draw a shape or figure on the computer screen. Users typically draw shapes or figures on the computer screen through an input device, such as a touch-sensitive screen, mouse, track ball, tablet, or similar input device that captures the user's hand movements and translates these movements into figures on the screen. In the field of handheld computers, many user interfaces employ a stylus and a touch sensitive screen. For example, U.S. Pat. No. 4,972,496 to Sklarew, "Handwritten keyboardless entry computer system," discloses the combination of a touch-sensitive screen laid over a liquid crystal display matrix. Computer systems that allows users to draw shapes directly on the screen by converting hand movements into "freehand" lines and curves on the screen are well known in the art.

A known problem with this freehand method of drawing is that drawings can appear to be unclear. Because these drawings are typically done without the aid of a straightedge or other drafting apparatus, lines and curves drawn by the user's hand can appear to be crooked, uneven, and jagged. Further, a touch sensitive matrix laid over a display screen sometimes has a lower resolution than the resolution of the display screens. This results in undesirable drawings that are unclear.

A solution to this problem is to program the computer system to analyze the shapes drawn by a user, determine what shapes the user drew, and re-draw those shapes using straight lines and smooth curves. Such systems typically perform three steps.

First, this system allows the user to draw a freehand drawing through the use of an input device, such as a touch sensitive screen. Second, the system performs an analysis of the user's drawing. Third, the system erases the user's freehand drawing and draws a perfected drawing using the drawing analysis made in the prior step. This drawing is typically made through any of a number of prior art methods that are well known in the field.

One prior art system described in Theo Pavlidis & Christopher J. Van Wyk, "An Automatic Beautifier for Drawings and Illustrations," Siggraph vol. 19, pp. 225-234, San Francisco, Jul. 22-26, 1985 [hereinafter "Pavlidis & Van Wyk"] used a clustering technique. Pavlidis & Van Wyk disclose a system that groups together sets of points drawn by the user when the difference in values in the distance between adjacent elements is less than some small constant. Following this grouping, the clustering algorithm disregards clusters that are wider than some other predefined constant, and splits clusters in two when their width indicates they may contain more than one line. The algorithm then derives equations that can be used to draw lines. The Pavlidis & Van Wyk system does not store or analyze data such as the order in which the user drew each point or the speed with which each point was drawn. The Pavlidis & Van Wyk system produces undesirable results when it is applied to drawings that contain a large number of points, especially drawings that contain closely overlapping lines, because it depends on the proper prior selection of the aforementioned constants in order to distinguish between closely spaced lines.

Another prior art system disclosed by Bozinovic et al. in U.S. Pat. No. 5,544,265, "Shape recognizer for graphical computer systems" records the speed and trajectory of a stylus as it passes over a screen. Bozinovic discloses a system that analyzes drawings by determining line segment end points and then determining whether segments between end points are straight or curved. Bozinovic does not disclose a method by which the system determines the location of the end points or how the system determines whether a segment is straight. Bozinovic requires a number of computationally expensive calculations.

Another prior art system is described in Joaquim A. Jorge & Manuel J. Fonseca, "A Simple Approach to Recognise Geometric Shapes Interactively," Departamento de Engenharia Informática, IST/UTL, Av. Rovisco Pais, 1049-001 Lisboa, Portugal [hereinafter "Jorge & Fonesca."] Jorge & Fonesca analyzed drawings by calculating geometric characteristics of the user's drawing, and comparing these geometric characteristics to those of a set of known ideal figures. Jorge & Fonesca's method calculates the convex hull, smallest-area regular polygons, perimeter and area scalar ratios of the user's drawing and compares these characteristics with the characteristics of known figures. This method has the disadvantage of recognizing only those ideal figures that were anticipated by the system's designers. If a user draws a figure that the system's designers did not anticipate, it will not correctly recognize it, because it will be unable to compare the drawing's geometric characteristics with ideal geometric characteristics for that figure. This system also carries an undesirable risk of incorrect analysis when two ideal figures, such as an isosceles triangle and a right triangle, have similar characteristics.

BRIEF SUMMARY OF THE INVENTION

A computer system that addresses some of the foregoing deficiencies of the prior art is described. Software that recognizes shapes drawn by a user in accordance with the present invention analyzes a drawing by estimating the locations of important points in the drawing. The computer system records both the points that comprise a user's freehand drawing and also the order in which each point was drawn relative to the others. By iteratively locating the point in a drawing that is farthest from a hypothetical line drawn through two of the drawing's known or postulated important points, the system locates both vertices of angles and closed plane figures as well as knot points for calculation of a cubic spline.

Several objects and advantages of the present invention are:

To resolve the deficiencies of prior art mechanisms for recognizing user-drawn shapes;

To recognize quickly arbitrary shapes drawn by a user;

To reduce the memory required to store a user's drawing by simplifying a freehand scribble drawn by a user through the representation of that scribble as a set of points connected by lines and curves;

To recognize arbitrary shapes drawn by a user without the use of computationally expensive functions;

To recognize line segments drawn by a user and distinguish them from other potential drawn shapes;

To recognize triangles, rectangles, and other closed figures with straight sides drawn by a user and distinguish them from other potential drawn shapes;

To recognize figures comprised of a sequence of straight line segments drawn by a user and distinguish those figures from other potential drawn shapes;

To recognize splines drawn by a user and distinguish them from other potential drawn shapes;

To recognize ellipses drawn by a user and distinguish them from other potential drawn shapes.

DETAILED DESCRIPTION OF THE INVENTION

The present invention is well suited for graphical computer systems or similar environments that allow the user to manipulate objects through the use of an input device. The preferred embodiment is a pen-based computer, such as one with a touch-sensitive screen laid over a liquid crystal display matrix. The invention can also be embodied in a computer system with a mouse, track ball, tablet, Global Positioning System-based device, or similar input device that captures the user's movements and translates these movements into figures on the screen. The use of such devices to capture movements is well known to those skilled in the art.

A pen-based computer system using the methods in accordance with a preferred embodiment of the present invention includes a central processing unit, memory, input device, and operating system. One method to practice and/or implement the invention is to program a standard programmable handheld computer, such as a computer capable of running the Palm OS operating system published by Palm, Incorporated of Santa Clara, Calif. or a computer capable of running the Pocket PC operating system published by Microsoft Corporation of Redmond, Wash. The invention can also be practiced and/or implemented with a standard desktop, laptop, or notebook computer with an input device as described above and running a graphical operating system, such as the Windows operating system published by Microsoft Corporation or the MacOS operating system published by Apple Computer of Cupertino, Calif. The invention's practice and implementation is not restricted to these potential embodiments.

The system takes as its input a string of points, representing the user's drawing. As the user draws, the computer system determines the position of the input device several times per second. The precise timing of this determination may vary depending on the specific implementation, but for best results should occur as often as the computer's operating system can check the input device's position. As the user moves the input device, the computer system records the coordinates of the input device and the order in which the pen passed through each coordinate. The preferred embodiment for this memory structure is a stack or linked list of coordinate pairs, but can also be implemented as an array. Thus, as the user draws, the system stores in its memory the points the user draws, and also the order in which each point is drawn relative to each other point. Other information may be stored, such as velocity or timing of the user drawing movements, but this other information need not been stored in the preferred embodiment of the invention. Any set of points associated with an order in which they were drawn, created, or otherwise generated shall be referred to herein as a "scribble." One point on a scribble is said to be "between" two other points on the scribble if the point was drawn before one and after the other.

When the user finishes drawing, the user typically so indicates to the computer system through the use of an input device. In the preferred embodiment, the user presses the pen into the touch-sensitive screen while drawing and lifts the pen from the touch-sensitive screen when the drawing is complete.

After the user indicates the drawing is complete, the computer system typically analyzes the scribble to guess what shape the user drew. As used herein, "shape" means, for example: 1) a set of one or more line segments connected to each other, such as a closed plane figure or angle, or 2) a planar curve, such as an ellipse or a cubic spline. The term "closed plane figure" is well known in the field of geometry. Closed plane figures are formed by three or more vertices joined by line segments (or "sides") such that each vertex is the endpoint of exactly two line segments. The terms "spline" and "knot" are well known in the field of geometry. Splines are curves, which are usually required to be continuous and smooth. Splines are usually defined as piecewise polynomials of degree n with function values and first n−1 derivatives that agree at the points where they join. The abscissa values of the join points are called knots.

Figure 1:
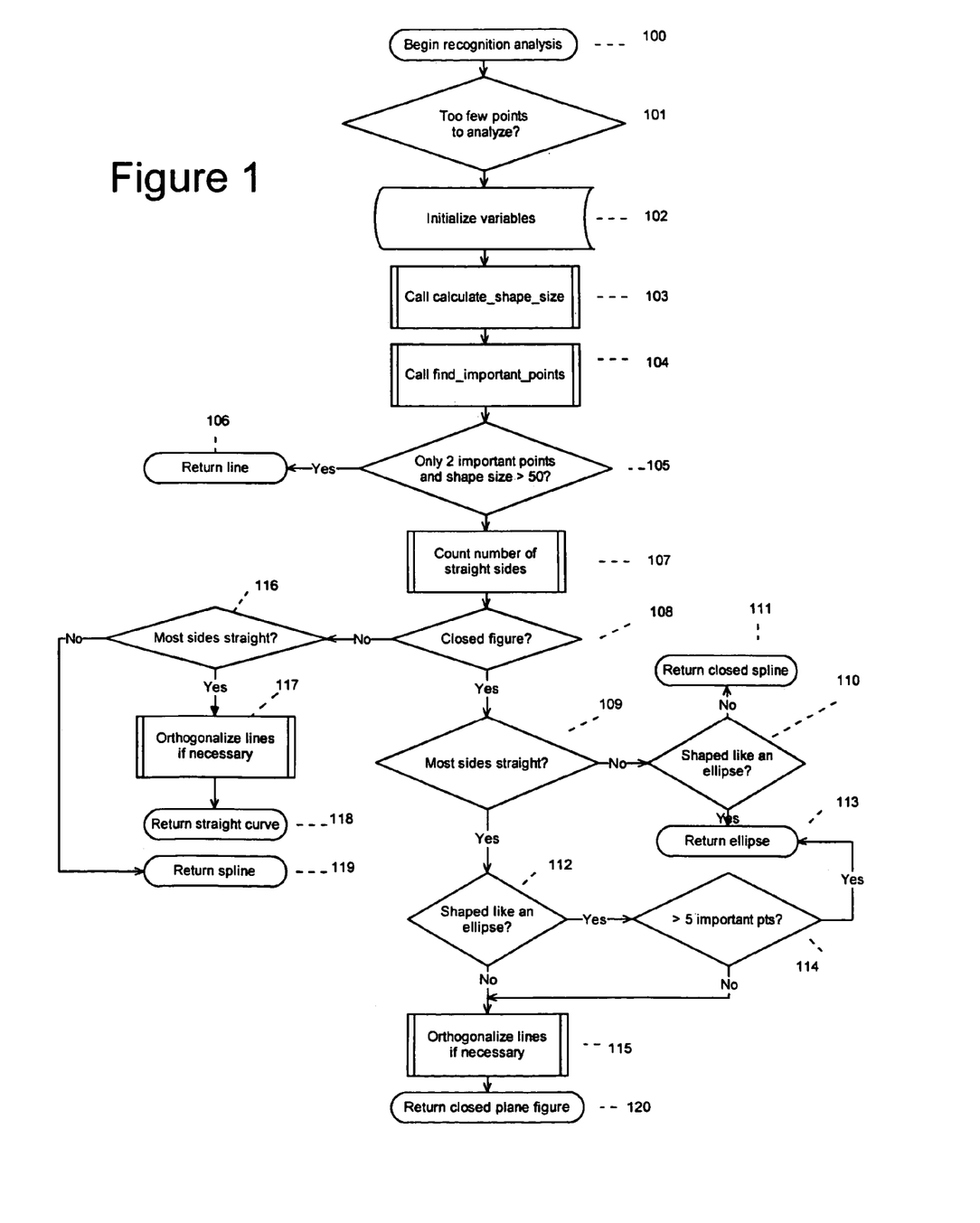
FIG. 1 is a flow diagram illustrating the operation of a preferred embodiment of the present invention.

Referring to FIG. 1, the recognition analysis begins at step 100, and proceeds to step 101 in which the analysis compares the number of points in the scribble to the minimum number of points necessary for the analysis to proceed. If there are too few points to analyze, the recognition aborts as unsuccessful. In an embodiment in which the user has a drawing space of 160 pixels by 160 pixels, trial and experimentation has revealed that it is advantageous to abort the recognition at this point if the user draws two points or fewer. A different value can be computed for a different size computer screen through experimentation.

If there are an adequate number of points to analyze, flow proceeds to step 102. After initializing variables necessary for the individual implementation of the analysis at step 102, flow proceeds to step 103, in which the computer generates a single number representing the size of the drawn shape. This number is preferably equal to the distance in pixels between the two points in the scribble that are farthest from each other.

Flow then proceeds to step 104, in which the scribble is analyzed to locate what are referred to herein as "important points." As used herein, an "important points" means any of the following: endpoints of line segments; endpoints of a spline; the first and last points of a scribble; vertices of angles; vertices of closed plane figures; and those points in a curve that can be used as knots in the drawing of a cubic spline. Important points are those points that are necessary for recognizing the drawn shape and drawing the corrected, smooth version of the shape. The analysis in step 104 is described further in relation to FIG. 3 below.

Flow then proceeds to step 105, in which the computer system determines whether it has found only two important points total and the shape size determined in step 103 is greater than a predetermined constant. In an embodiment in which the user has a drawing space of 160 pixels by 160 pixels, trial and experimentation has revealed that it is advantageous to use a number of approximately 50 as the predetermined constant in this step. A different value can be computed for a different size computer screen through experimentation. If the criteria of this comparison are met, the analysis ends at step 106, in which it preferably returns the result of a line segment between the two identified important points. Otherwise, flow proceeds to step 107.

At step 107, the analysis determines how many straight sides are in the user's scribble. For each set of points in the scribble bounded by important points but containing no important points, the analysis determines whether the set should be represented as a straight line segment or as a curve. This analysis is described further in relation to FIG. 5 below. Because this analysis involves analysis of aggregate statistics derived from the distance between points that the user drew and a hypothetical line segment connecting two important points, in the preferred embodiment this step is performed as part of the same loop that performs step 104 above. It is shown here as a separate loop for the purpose of clarity.

At step 108, the analysis determines whether the user has drawn a closed figure. This analysis is described below in relation to FIG. 6. If the analysis concludes that the user has drawn a closed figure, flow proceeds to step 109; otherwise, it proceeds to step 116.

At step 116, the analysis determines whether the proportion of straight sides to curved sides is greater than a predetermined ratio. In an embodiment in which the user has a drawing space of 160 pixels by 160 pixels, trial and experimentation has revealed that it is advantageous to use a number of about 0.5 as the predetermined ratio in this step. A different value can be computed for a different size computer screen through experimentation. Because this ratio can be highly determinative to the recognition analysis, the preferred embodiment allows the user to configure the recognition system by adjusting this ratio. If the proportion of straight sides is equal to or greater than the ratio, flow proceeds to step 117; otherwise, flow proceeds to step 119.

At step 117, the analysis adjusts the locations of the important points identified in step 104 in order to adjust angles to appear to be right angles. By reaching step 117, the analysis has determined that the user has drawn a series of connected straight-line segments. For example, if the angles drawn by the user appear to be within about 10 degrees of a right angle, the analysis moves the important points so that the angles are about 90 degrees. Flow then proceeds to step 118, from which it preferably returns the result of a series of connected straight-line segments.

At step 119, the analysis has determined that there are fewer straight segments than would be required to describe the drawing as a series of connected straight line segments. The analysis therefore preferably returns the conclusion that the user drew a spline.

If, at step 108, the analysis determines that the user drew a closed figure, flow proceeds to step 109, in which the analysis conducts the same comparison described above in relation to step 116. If the proportion of straight sides is approximately equal to or approximately greater than the ratio, flow proceeds to step 112; otherwise, flow proceeds to step 110.

At step 110, the analysis determines whether the scribble is shaped like an ellipse. This is preferably accomplished by first hypothesizing two foci for the ellipse. One method of hypothesizing foci is to hypothesize the lengths of the semimajor and semiminor axes based on the locations of those points in the scribble that are furthest from each other. When two foci have been Postulated, for each point in the scribble the analysis calculates the sum of the distances between the point and each of the two foci. The point is preferably counted as one on an ellipse if the difference between this sum and what the sum would be if the point were on an ellipse is within a predetermined range. The analysis deems the scribble to be shaped like an ellipse if a predetermined percentage of all points in the scribble are counted as on an ellipse.

If the analysis determines that the scribble is an ellipse at step 110, the analysis preferably returns the result at step 113 that the scribble is an ellipse. Otherwise, the analysis preferably returns the result at step 111 that the scribble is a closed spline. A "closed spline" is a spline with more than two knots in which the first knot is at the same position as the last knot.

If, at step 109, the analysis determines that the proportion of straight sides is not approximately equal to or greater than the predetermined ratio, flow proceeds to step 112. At step 112, the analysis performs the same analysis described in reference to step 110 above to determine whether the scribble is shaped like an ellipse. If the analysis determines that it is not shaped like an ellipse, flow proceeds to step 115. If the analysis determines that it is shaped like an ellipse, flow proceeds to step 114. At step 114, the analysis determines whether there are more than, for example, 5 important points in the scribble. If there are, flow proceeds to step 113, returning the result of an oval. If not, flow proceeds to step 115.

At step 115, the analysis performs the same adjustment of important points described above in reference to step 117. Then, flow proceeds to step 120, at which the analysis preferably returns the result that the user has drawn a closed plane figure.

Figure 2:
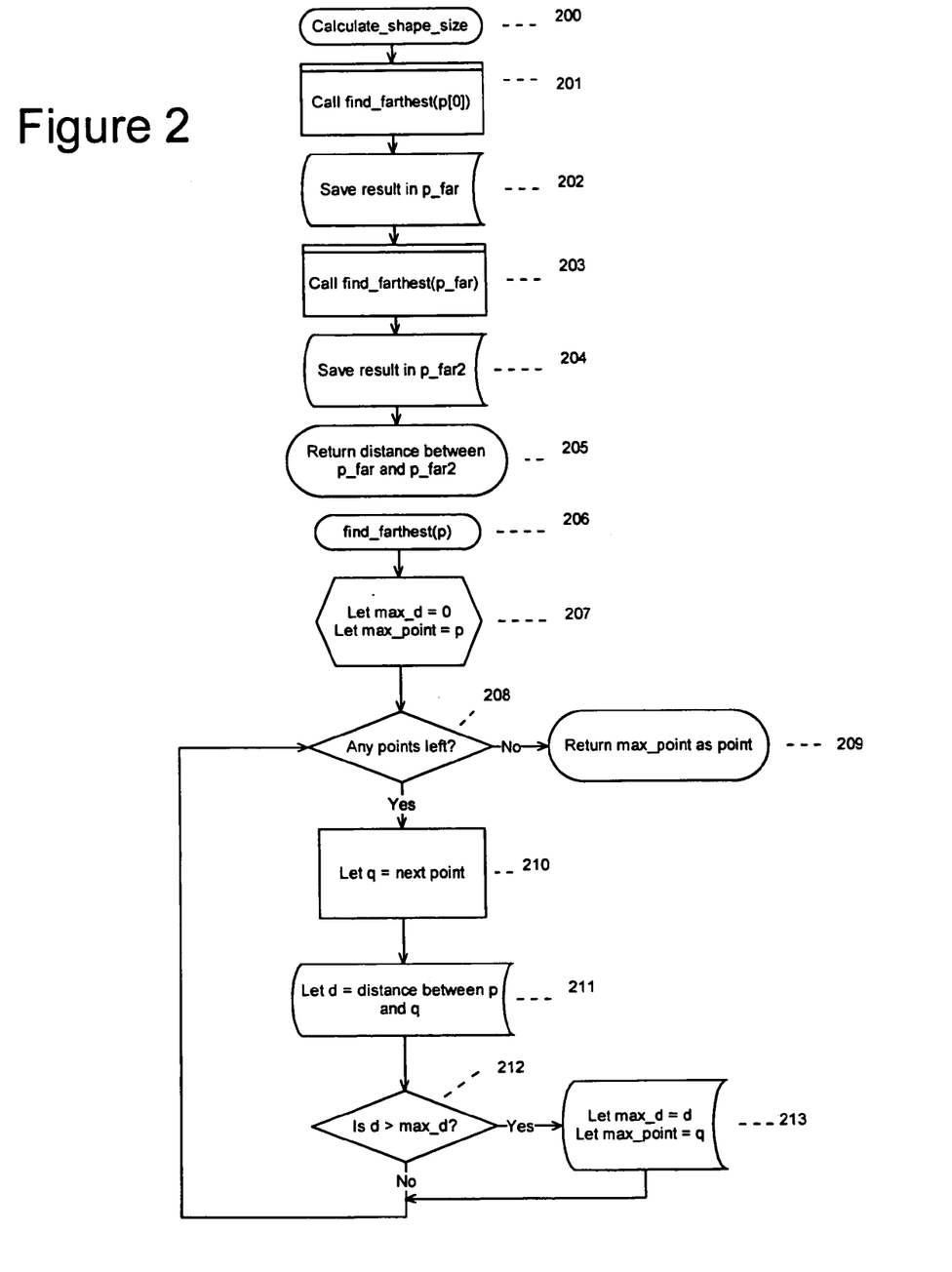
FIG. 2 is a flow diagram illustrating the "CALCULATE_ SHAPE_SIZE" operation subroutine of FIG. 1.

Referring to FIG. 2, the analysis performs the calculation of shape size as required by step 104 of FIG. 1 as follows. The subroutine is called at step 200, and proceeds to step 201. At step 201, the analysis calls the FIND_FARTHEST subroutine with the first point in the scribble as an argument. The FIND_FARTHEST subroutine will be described further below in relation to step 206. The FIND_FARTHEST subroutine preferably returns that point in the scribble that is furthest from the point passed as an argument to it. At step 202, this result is preferably stored in the variable p_far. The FIND_FARTHEST subroutine is preferably then called for a second time at step 203, with p_far as an argument. At step 204, the result of the FIND_FARTHEST subroutine is preferably stored in p_far2. At step 205, the distance between p_far and p_far2 is preferably calculated and returned as the shape size. The standard Cartesian distance function is preferably used. If p_far is a point with Cartesian coordinates (x1, y1) and p_far2 is a point with Cartesian coordinates (x2, y2), then the distance d between p_far and p_far2 is preferably calculated:

$$d=\sqrt{(x2-x1)^2+(y2-y1)^2} \quad (1)$$

The FIND_FARTHEST subroutine's entry point is at step 206, at which the point passed to it is assigned to the variable p. The subroutine proceeds to step 207, at which the max_d variable is initialized to zero and the max_point variable is preferably assigned to variable p. At step 208, the subroutine begins to iterate through the points in the scribble. If no points remain in the scribble, flow continues to step 209. Otherwise, flow proceeds to step 210. At step 210, the next point in the scribble is preferably assigned to the variable q. At step 211, the subroutine calculates the distance between p and q, and assigns the distance to the variable d. At step 212, the subroutine branches based on whether d is greater than or equal to max_d. If yes, flow proceeds to step 213; if no, flow loops back to step 208. At step 213, max_d is preferably set equal to d, and max_point is preferably set to q, and flow then loops back to step 208. Step 208 continues the loop, until all points have been considered. When all points are considered, flow proceeds to step 209, at which the subroutine preferably returns max_point as the point furthest from point p.

Figure 3:
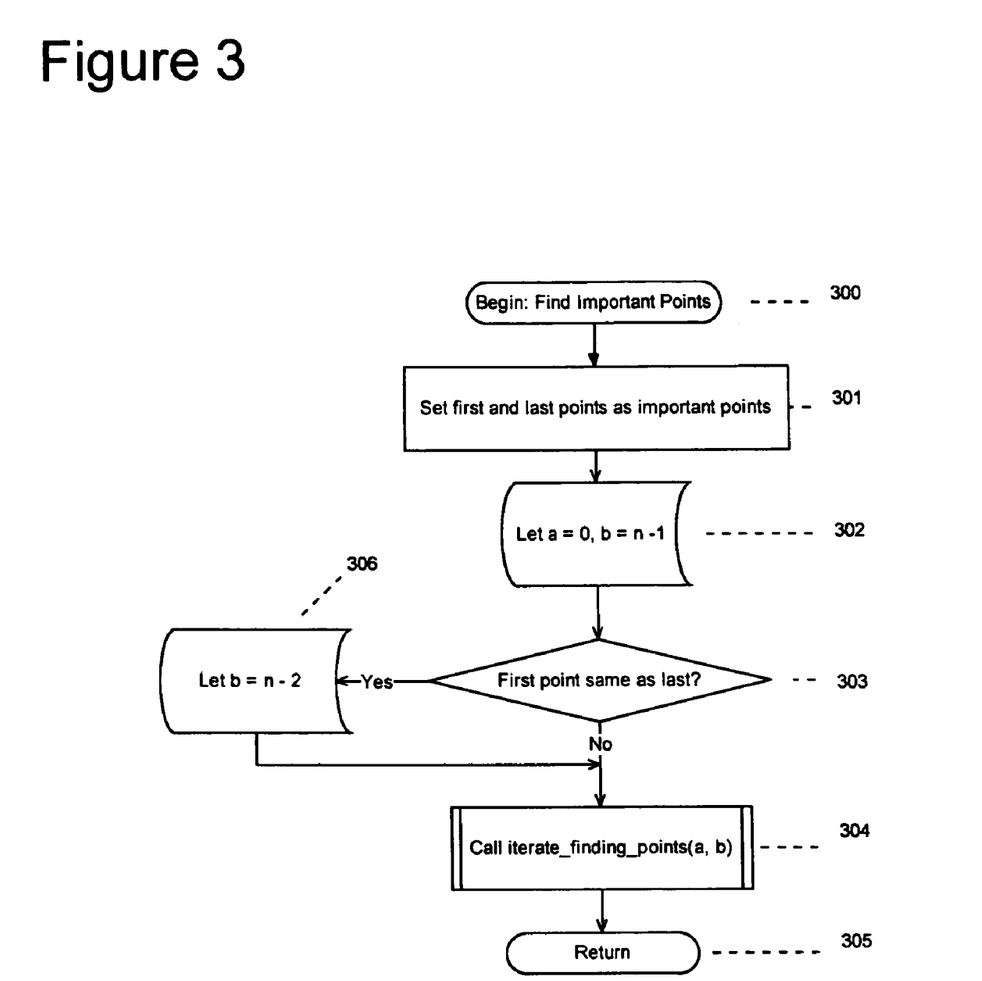
FIG. 3 is a flow diagram illustrating the "FIND_IMPORTANT_POINTS" operation subroutine of FIG. 1.
Figure 4:
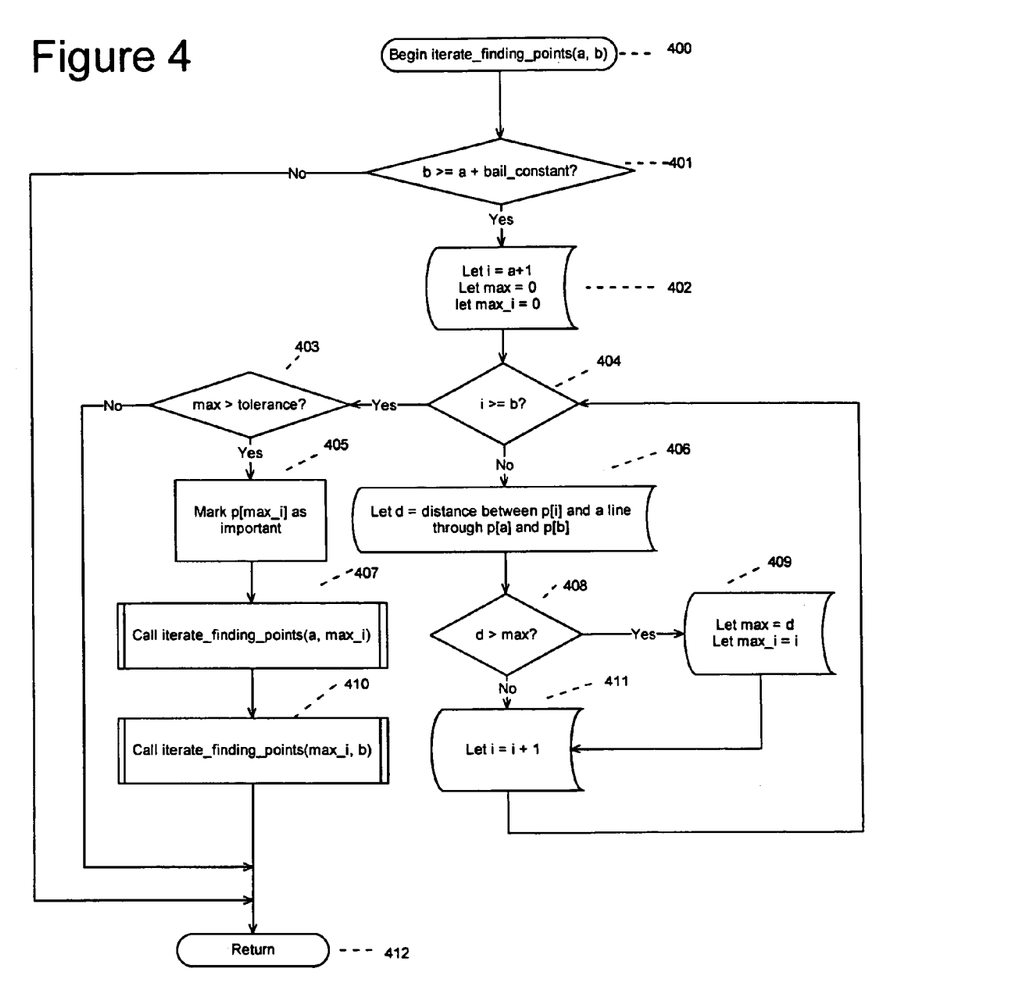
FIG. 4 is a flow diagram illustrating the "ITERATE_FINDING_POINTS" operation subroutine of FIG. 3.

Referring to FIG. 3, the FIND_IMPORTANT_POINTS subroutine called at step 104 in FIG. 1 begins at step 300. Trial and experimentation have revealed that the most practicable way to implement both the FIND_IMPORTANT_POINTS routine and the ITERATE_FINDING_POINTS routine described below in reference to FIG. 4 is to store all of the points in the scribble in a random-access array, allowing the analysis to consider any point in any order. The array is preferably organized by having the position of a point in the array directly correspond to the order in which it was drawn by the user. This array will be referred to hereinafter as the "scribble array." The flow proceeds to step 301, in which the first and last points in the scribble array are automatically determined to be important points. Flow proceeds to step 302, at which variables a and b are initialized, with a set to the index for the first point in the scribble, and b set to the index for the last point in the scribble. Flow proceeds to step 303, where the subroutine branches based on whether the first and last points in the scribble are the same point. If so, flow proceeds to step 306, where b is preferably set to the index of the second-to-last-point in the scribble, and from there flows to step 304. If the first and last points in the scribble are not the same, flow proceeds from step 303 to step 304. At step 304, the subroutine calls the ITERATE_FINDING_POINTS subroutine with a and b as arguments. The ITERATE_FINDING_POINTS subroutine is described further in relation to FIG. 4 below. After this routine returns, at step 305 the FIND_IMPORTANT_POINTS subroutine terminates, having located the important points.

The ITERATE_FINDING_POINTS routine is described in FIG. 4. While FIG. 4 shows an implementation of ITERATE_FINDING_POINTS as a recursive subroutine, other implementations are possible, including but not limited to a non-recursive subroutine that stores arguments on an internal stack. Referring to FIG. 4, ITERATE_FINDING_POINTS begins its execution at step 400, at which it is preferably called with arguments a and b, which represent indices to the scribble array. The subroutine flow proceeds to step 401, from which flow passes to step 402 if and only if the difference between a and b is greater than a predetermined bail_constant. In an embodiment in which the user has a drawing space of 160 pixels by 160 pixels, trial and experimentation has revealed that it is advantageous to give the bail_constant a value of 4. A different value can be computed for a different size computer screen through experimentation. Step 401 branches to step 412 if the difference is too small, but proceeds to step 402 otherwise. At step 402, the variable i is initialized to a+1, the variable max is initialized to zero, and the variable max_i is initialized to zero. Flow then proceeds to step 404, which branches based on whether i is greater than or equal to b. If so, flow proceeds to step 403; otherwise, flow proceeds to step 406.

At step 406, the variable d is preferably assigned to the distance between the point p[i], which is the point in the scribble array referenced by the index i, and a Postulated line passing through the points p[a] and p[b]. The derivation and use of the formula for finding the distance between a point and a line is well known in the field of geometry, and is repeated here for the reader's convenience. If (x0, y0) is a point on a plane, and (x1, y1) and (x2, y2) are also points on the same plane, then the distance d between (x0, y0) and a line passing through (x1, y1) and (x2, y2) is given by:

$$d = \frac{|(y2-y1)(x0-x1) - (x2-x1)(y0-y1)|}{\sqrt{(x2-x1)^2 + (y2-y1)^2}} \quad (2)$$

After step 406, flow proceeds to step 408, and from there branches to step 409 if d is greater than max, and to step 411 if otherwise. At step 409, max is preferably set to equal d, and max_i is preferably set to equal i. Flow then proceeds to step 411. At step 411, i is incremented and flow loops back to step 404, until all points in the scribble array have been analyzed.

Flow proceeds to step 403 from step 404 after the loop is complete. At step 403, flow branches to step 405 if max is greater than a predetermined tolerance value, and to step 412 if otherwise. The tolerance value is preferably calculated beforehand, based on the size of the scribble. In an embodiment in which the user has a drawing space of 160 pixels by 160 pixels, trial and experimentation has revealed that the tolerance value should be calculated as follows: Set tolerance to be 2 if the shape size is less than 25, to 5 is the shape size is less than 50, and to 10 otherwise. A different set of values can be computed for a different size computer screen through experimentation.

At step 405, the point in the scribble array referred to by the index max_i is preferably determined to be an important point. Flow then proceeds to step 407. Step 407 recursively calls the ITERATE_FINDING_POINTS function, with a and max_i as arguments. After this recursive call returns, flow proceeds to step 410. Step 410 recursively calls the ITERATE_FINDING_POINTS function, with max_i and b as arguments. Flow then proceeds to step 412. Step 412 terminates the routine.

Figure 5:
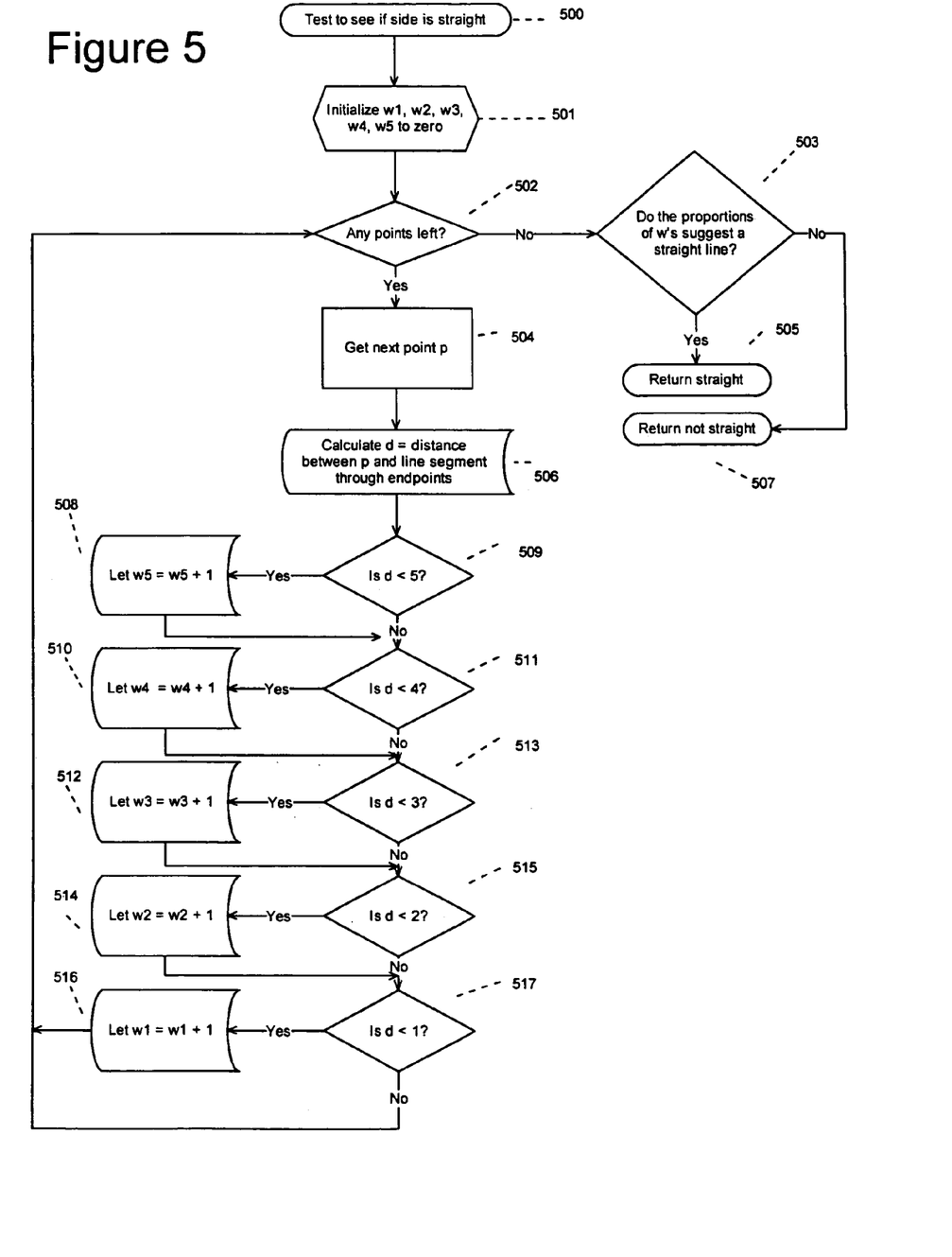
FIG. 5 is a flow diagram illustrating the operation of determining whether a set of points should be represented as a straight line segment or a curve.

Referring to FIG. 5, the analysis determines whether a set of points in a scribble between two important points resembles either a curve or a line segment as follows. Flow begins at step 500. From there it proceeds to step 501, at which the variables w1, w2, w3, w4, and w5 are initialized to zero. The analysis then begins to consider each of the points in the set of points in their scribble order. Flow proceeds to step 502, which branches based on whether there are any points left in the set of points to consider. If so, flow proceeds to step 504, which takes the next point and assigns it to the variable p. The analysis then proceeds to step 505, which calculates as d the distance between p and a postulated line extending through the two important points. This calculation uses the formula described in Equation 2 above.

After calculating d, flow proceeds to step 509. Step 509 branches based on whether d is greater than 5. If not, flow proceeds to step 511, which branches based on whether d is greater than 4. If not, flow proceeds to step 513, which branches based on whether d is greater than 3. If not, flow proceeds to step 515, which branches based on whether d is greater than 2. If not, flow proceeds to step 517, which branches based on whether d is greater than 1. If step 509 determines that d is greater than 5, flow proceeds to step 508, which increments the w5 variable by one, and from there flow proceeds to step 511. Otherwise, flow proceeds from step 509 to step 511. If step 511 determines that d is greater than 4, flow proceeds to step 510, which increments the w4 variable by one, and from there flow proceeds to step 513. Otherwise, flow proceeds from step 511 to step 513. If step 513 determines that d is greater than 3, flow proceeds to step 512, which increments the w3 variable by one, and from there flow proceeds to step 515. Otherwise, flow proceeds from step 513 to step 515. If step 515 determines that d is greater than 2, flow proceeds to step 514, which increments the w2 variable by one, and from there flow proceeds to step 517. Otherwise, flow proceeds from step 515 to step 517. If step 517 determines that d is greater than 1, flow proceeds to step 516, which increments the w1 variable by one, and from there flow loops back to step 502. Otherwise, flow proceeds from step 517 to loop back to step 502.

If at step 502 the analysis determines that there are no more points in the set to be considered, flow proceeds to step 503. Step 503 branches based on whether the ratios of w1 to the number of points, w2 to the number of points, w3 to the number of points, and so on, falls within predetermined ranges. In an embodiment in which the user has a drawing space of 160 pixels by 160 pixels, trial and experimentation has revealed that it is advantageous to return the result that a side is straight if the ratio of w1 to the number of points is greater than 0.21 and the ratio of w2 to the number of points is greater than 0.42 and the ratio of w3 to the number of points is greater than 0.53 and the ratio of w4 to the number of points is greater than 0.66 and the ratio of w5 to the number of points is greater than 0.74. Comparisons to other statistical distributions are possible. A different set of values can be computed for a different size computer screen through experimentation.

If the w-variables are within the predetermined ranges, flow proceeds to flow 505, which preferably returns the result that the set of points is straight. Otherwise, flow proceeds to step 507, which preferably returns the result that the set of points is curved.

Figure 6:
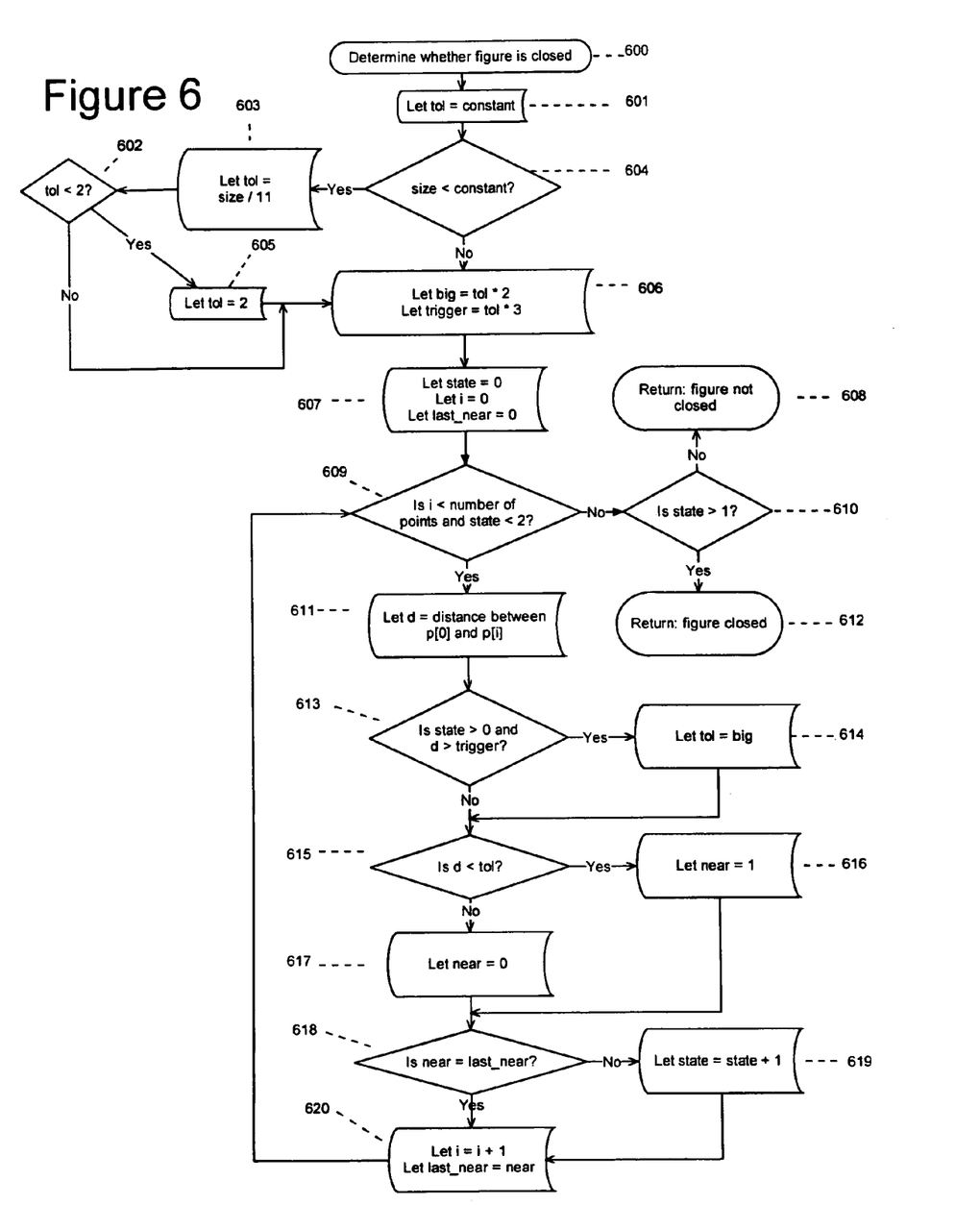
FIG. 6 is a flow diagram illustrating the operation of determining whether a scribble should be represented as a closed figure.

Referring to FIG. 6, the subroutine called at step 108 in FIG. 1 to determine whether the scribble is a closed figure begins at step 600. Flow proceeds to step 601, where the variable tol (an abbreviation of "tolerance") is preferably initialized to an initial tolerance constant. In an embodiment in which the user has a drawing space of 160 pixels by 160 pixels, trial and experimentation has revealed that it is advantageous to use a number of approximately 6 as the predetermined constant in this step. A different value can be computed for a different size computer screen through experimentation. Flow proceeds to step 604, from which it branches based on whether the size of the scribble is greater than a specified constant. In an embodiment in which the user has a drawing space of 160 pixels by 160 pixels, trial and experimentation has revealed that it is advantageous to define this constant as 50. A different value can be computed for a different size computer screen through experimentation. The size considered in step 604 is preferably the size calculated at step 103 in FIG. 1. If the condition tested at step 604 returns true, flow proceeds to step 603, where the tol variable is preferably set to equal the integer of size divided by eleven. Flow then proceeds to step 602, which branches based on whether tol is less than 2. If this condition returns true, flow proceeds to step 605, where tol is set to equal 2; otherwise, flow continues to step 606. If the condition tested at step 604 returns false, flow proceeds to step 606. At step 606, the variable big is preferably set to equal tol multiplied by 2, and the variable trigger is preferably set to equal tol multiplied by 3. Flow then proceeds to step 607, where the variable state is preferably initialized to zero, the variable i is preferably initialized to zero, and the variable last_near is preferably initialized to zero. Flow then proceeds to step 609. Step 609 branches based on whether i is less than the number of points in the scribble and state is less than 2. If this is true, flow proceeds to step 611. At step 611, the variable d is preferably set to equal the distance between the first point in the scribble and the point in the scribble indexed by i. This distance may be calculated using the formula shown above as Equation 1. For speed of calculation, the preferred embodiment does not calculate the square root, and keeps d equal to the square of the distance between the two points. Flow proceeds from step 611 to step 613, which branches based on whether state is greater than 0 and d is greater than trigger. If this condition tests false, flow proceeds to step 615, which branches based on whether d is less than tol. If this condition tests false, flow proceeds to step 617, where the variable near is preferably set to zero. Flow then proceeds to step 618, which branches based on whether near is equal to last_near. If this condition tests true, flow proceeds to step 620. At step 620, the variable i is incremented, and the variable last_near is preferably set to equal near. From step 620, flow proceeds to loop back to step 609.

If the condition tested at step 613 is true, flow proceeds to step 614. Step 614 sets the variable tol to equal big. Flow then proceeds to step 615. If the condition tested at step 615 is true, flow proceeds to step 616. Step 616 sets the variable near to equal one. Flow then proceeds to step 618. If the condition tested at step 618 is true, flow proceeds to step 619. Step 619 increments the state variable by one. Flow then proceeds to step 620.

If the condition tested at step 609 is false, flow proceeds to step 610. Step 610 branches based on whether state is greater than one. If this condition is true, flow proceeds to step 612, which preferably returns the result that the figure is closed. If this condition is false, flow proceeds to step 608, which preferably returns the result that the figure is not closed.

In light of foregoing disclosures, the method for recognizing shapes in accordance with this invention provides a fast, flexible, preferably accurate method for representing a user's drawings as clean shapes.

While the above description contains many specificities, these should not be construed as limitations on the scope of the invention, but rather as an exemplification of preferred embodiments thereof. Many other variations are possible. For example, the constants described above can be made dynamic variables, which the user can adjust or which can be adjusted, for example, through an adaptive learning algorithm. Similarly, the invention can be applied to simplify the description of a path of movement taken by an object over terrain. Similarly, the invention can be employed as a compression technique.

Accordingly, the scope of the invention should be determined not by the embodiments illustrated, but by the appended claims and their legal equivalents.

I claim:

1. A method of recognizing shapes from a scribble, the method comprising the steps of:
   a. identifying one or more important points in a scribble;
   b. determining whether said scribble resembles a closed figure;
   c. determining whether said scribble resembles a figure with more straight sides than curved sides;
   d. recognizing said scribble as a line segment if said scribble has exactly two important points;
   e. recognizing said scribble as a piecewise linear curve if said scribble has more than two important points and said scribble has more straight sides than curved sides and said scribble is not a closed figure;
   f. recognizing said scribble as a spline if said scribble has more than two important points and said scribble does not have more straight sides than curved sides and said scribble is not a closed figure;
   g. recognizing said scribble as a closed plane figure if said scribble has more than two important points and said scribble has more straight sides than curved sides and said scribble is a closed figure;
   h. recognizing said scribble as a closed spline if said scribble has more than two important points and said scribble does not have more straight sides than curved sides and said scribble is a closed figure.

* * * * *